Dec. 9, 1969    A. L. KUCERIS    3,482,475
RECESS DEBURRING TOOL
Filed Dec. 29, 1967
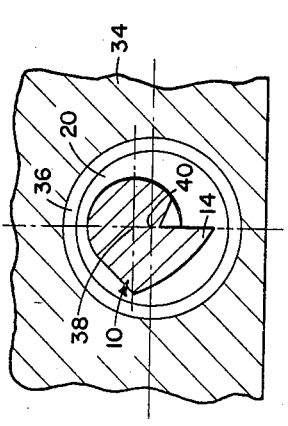
FIG. 2
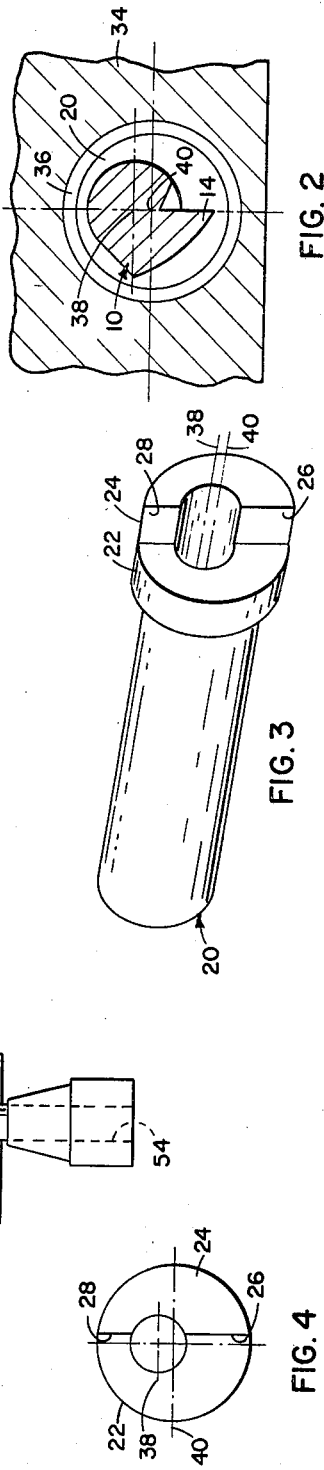
FIG. 5
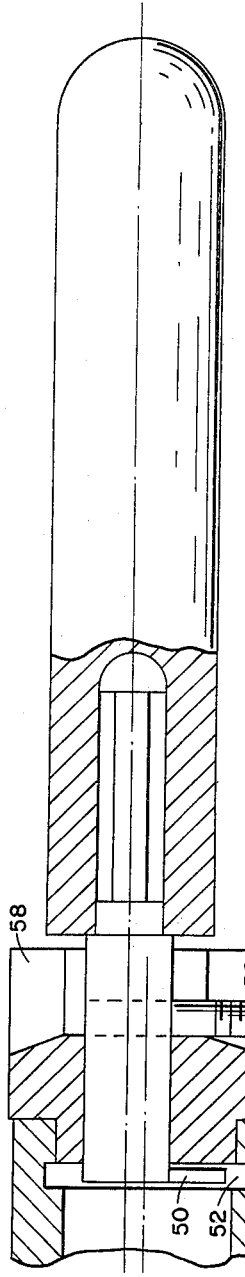
FIG. 3
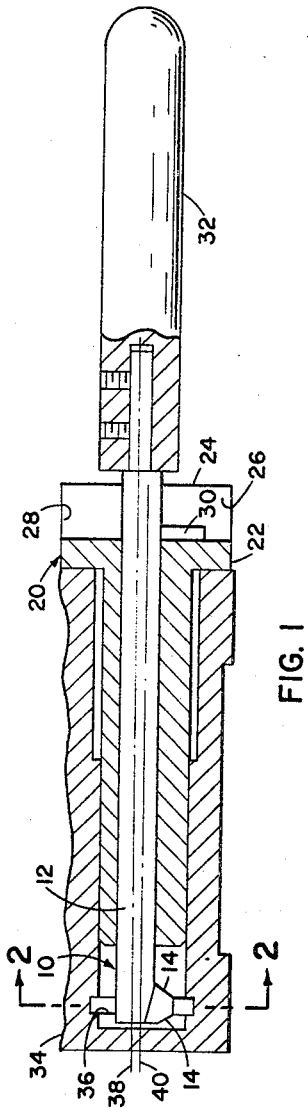
FIG. 1
FIG. 4
Arijs L. Kuceris,
INVENTOR.
BY

United States Patent Office 3,482,475
Patented Dec. 9, 1969

3,482,475
RECESS DEBURRING TOOL
Arijs L. Kuceris, Methuen, Essex County, Mass., assignor, by mesne assignments, to the United States of America as represented by the Secretary of the Army
Filed Dec. 29, 1967, Ser. No. 694,590
Int. Cl. B23b 47/34
U.S. Cl. 77—58                                    1 Claim

ABSTRACT OF THE DISCLOSURE

A tool to be used for chamfering a sharp recess edge-front or edge-back, and for deburring the inside of a recess. The tool operation is based on a cam action and its construction consists basically of a recess cutter, a pilot bushing, a driving pin, and handle.

SUMMARY OF THE INVENTION

A deburring tool wherein an offset cam action is utilized in removing burrs from recessed edges and corners. A pilot bushing acts as a cam to bring a recess cutter into cutting position and acts as a guide for the cutter. It is possible to deburr a recess with quality that eliminates the guess work involved with hook-knives and abrasive wheels. It is possible to deburr recesses in deep holes and eliminates the use of expensive form recessing cutters. The deburring tool described herein permits boring a part after a recess has been machined therein since the burrs that are created when the bore penetrates the machined recess area can be accurately removed.

BRIEF DESCRIPTION OF THE DRAWING

FIGURE 1 shows a deburring tool, according to the present invention, inserted in a recess.
FIGURE 2 is a sectional view taken along the lines 2—2 of FIGURE 1 showing eccentricity between the shaft and bushing.
FIGURE 3 is a perspective view of the pilot bushing.
FIGURE 4 is an end view of the pilot bushing.
FIGURE 5 shows the deburring tool with an adjustment nut on the driving pin.

DESCRIPTION OF THE PREFERRED EMBODIMENTS

The deburring tool, as shown in FIGURE 1, consists of four main parts: a recess cutter 10, a pilot bushing 20, a driving pin 30, and a handle 32.

Pilot bushing 20 is designed for guiding cutter 10 into the bore of a part 34. The pilot bushing flange 22 acts as a locator for positioning the cutter in a recess 36 of part 34. A millout 24 of bushing flange 22 serves as a starting position stop 26 of recess cutter 10, allowing the cutter to clear the bore of part 34; as a stop for the cutting position 28 of the cutter; and as a driver of the cutter for deburring recess 36.

A hole through bushing 20 has a center line 38 that is offset from the center line 40 of bushing 20, the centers being separate and parallel. A shaft 12 of recess cutter 10 is inserted in bushing 20 with a cutting edge 14 positioned at the minimum distance from the center line 40 of bushing 20. This cutter position prevents cutting edge 14 from contacting the bore and recess 36 of part 34 prior to the desired positioning of the tool. Offset center line 38 through the hole in bushing 20 allows the bushing to act as a cam to bring recess cutting edge 14 into cutting position. This offset of centerline 38 through pilot bushing 20 is calculated to bring recess cutter 10 from a starting position at stop 26 to a cutting position at stop 28 when handle 32 is rotated 180°.

Driving pin 30 is pressed in the shaft 12 of recess cutter 10 to a given location. The pin is in the same geometrical plane as cutting edge 14 of cutter 10 and projects in the same direction as the cutting edge. Rotating cutter 10 results in simultaneous rotation of pin 30. When the cutter is rotated 180° and is in cutting position 28, driving pin 30 is also rotated and presses against the millout 24 of pilot bushing 20.

Continued rotation of handle 32 in the same direction will cause pin 30 to drive pilot bushing 20 and recess cutter 10 as one unit concentric to the bore of part 34.

Turning the tool one full turn (360°) or more from the cutting position 28 causes the cutter 10 to deburr the edges of recess 36 of part 34. When the full turn (or more if needed) of the deburring tool is completed, the cutter is retracted to the starting position and removed from the bore. Returning cutter 10 to the starting position prevents the cutter from dragging on and marring the recess and bore during withdrawal from the part 34.

FIGURE 2 is a sectional view of FIGURE 1 showing the offset of center line 38 from center line 40 of bushing 20. The cutting edge 14 of cutter 10 is shown in the starting position. The clearance between cutting edge 14 and the edge of recess 36 is approximately the same as the distance between center lines 38 and 40.

FIGURE 3 is a perspective view of pilot bushing 20 showing the millout 24 of flange 22. Face 26 of millout 24 is the starting position stop and face 28 is the cutting position stop.

FIGURE 4 is an end view of pilot bushing 20 showing the relative location of the faces 26 and 28 of millout 24 with respect to the center lines 38 and 40.

The deburring tool, as shown in FIGURE 5, operates basically as described previously. The cutter, however, is designed for use within the recess. Cutting edge 50 may be used to deburr large or small recesses within a predetermined range without changing to a different size of cutter. Once cutting edge 50 is located adjacent to recess 52 (in the starting position) it is rotated until cutting edge 50 reaches the bottom of recess 52. A tapered adjusting nut 54 is moved down a threaded driving pin 56 to fill any space between pilot bushing flange millout 58 and pin 56. After adjusting nut 54 is positioned, the recess is deburred in the same manner as previously described. Before the tool is removed from the recess, adjusting nut 54 should be released to allow cutter 50 to return to the starting position.

Larger diameter tools, for larger bores, can be designed to have a sufficient natural relief because of greater possible "offset." Smaller diameter tools must have additional cutting relief, which may be obtained by increasing the distance between the end of the bushing and the cutting edge. If the tool is large the handle may be an extension of the cutter shaft. The shape of the cutting edge may vary depending on the edges or surfaces being deburred.

Tools of this type must be designed and made as special tools for each application. However, the use of the cam action pilot bushing will be the same for all applications.

Although particular embodiments and forms of this inventon have been illustrated, it is understood that modifications may be made by those skilled in the art without departing from the scope and spirit of the foregoing disclosure and the following claims.

What is claimed is:
1. A deburring tool comprising: a pilot bushing having at a first end thereof a circular flange with a semi-circular end portion; a recess cutter having a shaft inserted through said bushing, said shaft extending out said first end of the bushing and said cutter protruding from another end of said bushing; a hole through said bushing, through which said cutter shaft extends, has a center line coincident with the shaft center line and offset from and parallel to the center line of said bushing; a driving pin inserted in said shaft at said first end of the bushing, said pin being disposed perpendicular to the length of said bushing, and protruding in the same plane and direction as a cutting edge of said recess cutter; a handle fixed to the shaft at said first end of the bushing for turning the cutter; said driving pin being threaded and extending beyond said bushing flange; and a tapered adjusting nut threadingly engaging said pin for varying said second terminal position to a position less than 180° from said first position, which also varies the distance said cutting edge protrudes beyond the radius of said bushing.

References Cited

UNITED STATES PATENTS

| 2,365,648 | 12/1944 | Rossmann | 77—73.5 |
| 2,571,395 | 10/1951 | Vawter | 77—73.5 |

FOREIGN PATENTS 438,881  12/1967  Switzerland.

OTHER REFERENCES

Publication: American Machinist, Apr. 24, 1924, p. 634. Copy in group 325; class 77, subclass 58.34.

GERALD A. DOST, Primary Examiner

U.S. Cl. X.R.

77—73.5